UNITED STATES PATENT OFFICE.

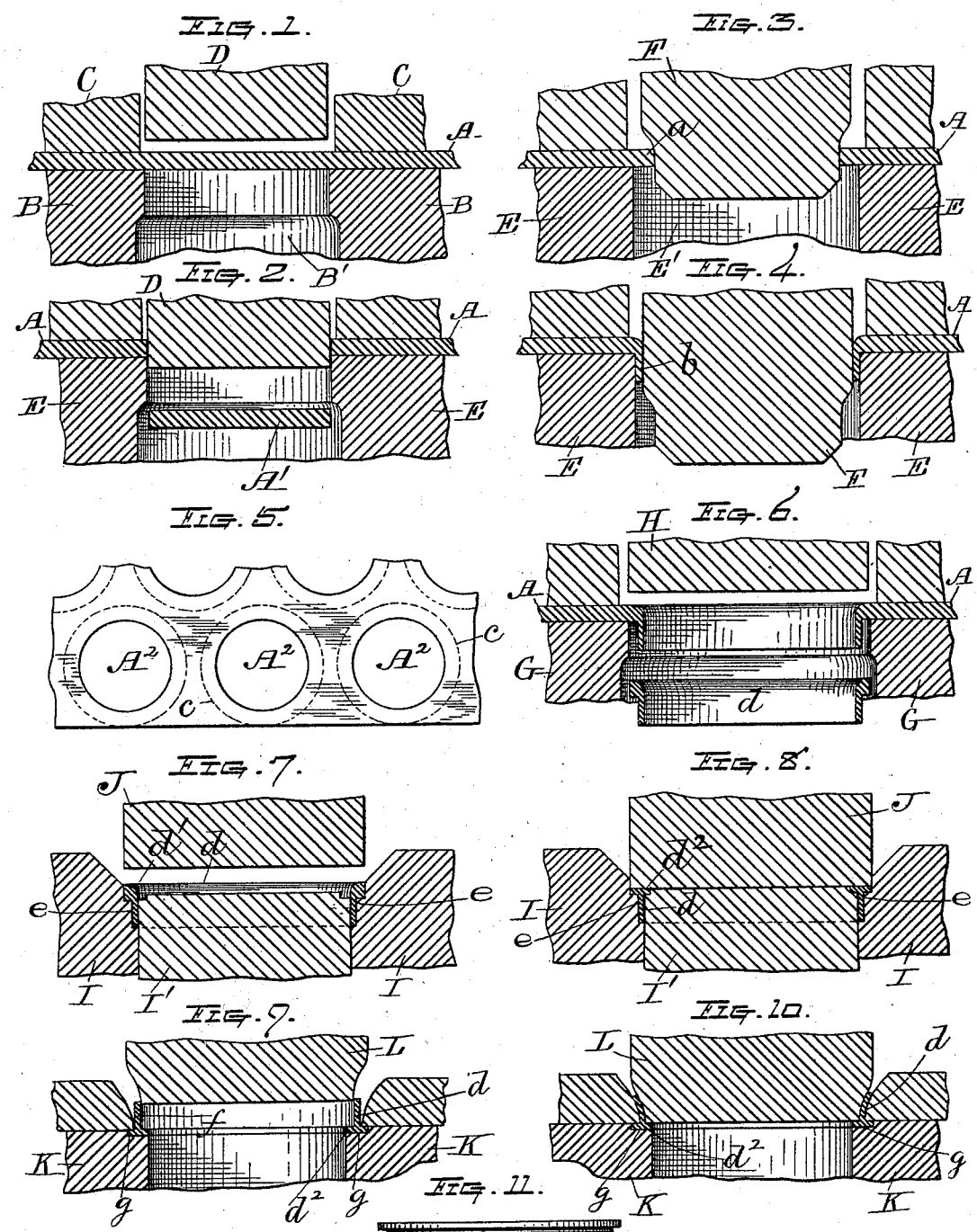

WILLARD H. BUXTON, OF WORCESTER, MASSACHUSETTS, ASSIGNOR TO THE HOUGHTON & BUXTON MANUFACTURING COMPANY, OF SAME PLACE.

METHOD OF MAKING SPINNING-RINGS.

SPECIFICATION forming part of Letters Patent No. 580,845, dated April 20, 1897.

Application filed May 14, 1896. Serial No. 591,535. (No model.)

*To all whom it may concern:*

Be it known that I, WILLARD H. BUXTON, of the city and county of Worcester and State of Massachusetts, have invented an Improved Method of Making Spinning-Rings; and I do hereby declare that the following is a full, clear, and exact description thereof, reference being had to the accompanying drawings, forming a part of this specification, and in which—

Figure 1 represents a vertical section through a piece of sheet metal from which the rings are cut and so much of the dies and punch for cutting the central disks therefrom to form the openings in said rings as is necessary to illustrate the application of my invention to practice, and all the other figures except Fig. 11 show the different steps or stages employed in carrying out my said improved method of making a spinning-ring, Fig. 11 being an edge view of an ordinary spinning-ring for spinning-machines. Fig. 2 shows the central disk above alluded to as having been severed from the sheet-metal plate and dropping down between the dies. Fig. 3 shows the punctured plate placed over another set of dies with the opening a little larger than that shown in Figs. 1 and 2 and the lower end of a punch in position to bend down and compress the edge of the sheet-metal plate around the opening therein. Fig. 4 shows said edge bent down and compressed as aforesaid. Fig. 5 is a plan view of a section of sheet-metal plate with several ring-openings shown punctured therein by full lines and also showing by dotted lines the outlines of the rings on the plate before being cut therefrom. Fig. 6 shows the plate in position for cutting said rings therefrom and also one of the severed rings as dropping down after having been cut from the plate. Fig. 7 shows the severed ring placed in suitable holding-dies preparatory to hammering the head into the desired shape. Fig. 8 shows said ring after its head has been hammered into shape. Fig. 9 shows the ring placed in a reversed position to that shown in the preceding figures preparatory to having its flange bent to flare outward. Fig. 10 shows the ring thus bent; and Fig. 11 shows the ring, as before stated, in its finished state.

The object of my invention is to simplify and cheapen, as far as is possible, the method of making the metal rings commonly used on spinning-machines. Said invention consists in cutting blank rings from a sheet-metal plate and forming the finished rings by means of suitable dies, punches, and a hammer in a series of successive steps or stages, as will be hereinafter more fully set forth.

My said improved method is carried out in the following manner: The sheet-metal plate A is first placed in proper position over the opening B' of the die B, preferably with the holding-die C over the same to hold it in position during the cutting operation, as is shown in Fig. 1 of the drawings. The punch D now descends, as is indicated in Fig. 2, and cuts the circular disk A' from the plate to form the opening $A^2$ in said plate, (see Fig. 5,) the severed disk dropping down out of the way, as is also shown in Fig. 2.

Other circular openings are likewise cut over the whole surface of the plate at a short distance apart, as is also indicated in Fig. 5, only sufficient metal being left around the opening to form the ring and support the remaining stock of said plate. The plate having been thus punctured it is now placed with one of its openings $A^2$ over another die E, whose opening E' is a little larger than that in the die B, so that the stock around the opening in the plate A will project a little over said opening E', as is shown in Fig. 3. The bending and forming punch F now descending, as is indicated in Fig. 4, bends the edge $a$ of the metal around the opening $A^2$ down and also compresses and flattens it out between the same and the die E, as is shown at $b$ in Fig. 4, thereby forming it into the desired shape preparatory to cutting the ring-blank from the metal plate at the point indicated by the dotted lines $c$ in Fig. 5. Said operation is now performed by placing the plate over another die G, with the downwardly-bent and flattened edge $b$ projecting down into the opening of said die and the metal plate projecting over said opening to the point indicated by the dotted line c, when it is ready to be severed from the main stock. The punch H now descending performs said operation and the partially-formed ring d drops down through the opening of the die, as is shown in Fig. 6. By now placing said ring-blank or partially-formed ring d in a recess or step e between two dies I I', as is shown in Fig. 7, and operating a hammer J up and down against the head d' thereof said head is flattened to form the double-flanged head $d^2$, (shown in Fig. 8 and the remaining figures of the drawings,) and thereby practically completing the formation of the ring ready for use. It is preferable, however, to have the necking f of said ring made slightly flaring, as is shown in the last two figures of the drawings, which may be done by placing the ring after it has been removed from the dies I I' in a step g, formed in a die K, with said ring in an inverted position, and moving a forming-punch L down into the small end of the ring, as is shown in Fig. 10, thereby bending or flaring out the neck f into the desired shape, the contour of the side of the lower end of the forming-punch L being made to conform to the shape desired for said flaring neck.

Those skilled in the art to which my invention appertains will at once perceive the practical advantages derived from forming spinning-rings in the manner hereinbefore described. The operation is simple and inexpensive to perform with the least possible waste of stock, and the rings thereby produced are of a high grade of workmanship and superior quality.

Having described my invention, what I claim as new, and desire to secure by Letters Patent, is—

The herein-described method of forming a spinning-ring from sheet metal, consisting in first cutting a circular disk from a sheet-metal plate smaller in diameter than the finished-ring opening; then bending the edge of the plate around said opening at right angles to said plate and compressing or flattening the same to form a flange of lesser thickness than the thickness of said plate; then cutting from the said metal plate a ring comprising said bent and compressed flange and a narrow circular strip of metal outside thereof, thus forming a ring the thickness of the metal plate and having a flange of lesser thickness than said plate, and then compressing the thicker portion or body of said ring by pressure applied in line with the said flange to flatten said body portion and thus form two oppositely-projecting flanges at right angles to the first-named flange, thereby producing a ring T-shaped in cross-section, substantially as and for the purposes set forth.

WILLARD H. BUXTON.

Witnesses:
W. B. NOURSE,
C. F. WESSON.